(12) United States Patent
Reichert

(10) Patent No.: US 7,293,429 B1
(45) Date of Patent: Nov. 13, 2007

(54) NURTURING NECKLACE SYSTEM

(76) Inventor: Patricia Reichert, 1485 Ohio Ave., Dunedin, FL (US) 34698

( * ) Notice: Subject to any disclaimer, the term of this patent is extended or adjusted under 35 U.S.C. 154(b) by 173 days.

(21) Appl. No.: 11/229,388

(22) Filed: Sep. 16, 2005

(51) Int. Cl.
*A44C 5/00* (2006.01)

(52) U.S. Cl. .................. 63/5.1; 446/491; 446/26; 132/275; 2/162

(58) Field of Classification Search ............ None
See application file for complete search history.

(56) References Cited

U.S. PATENT DOCUMENTS 5,343,608 A * 9/1994 MacDonald ............... 29/450
6,966,472 B2 * 11/2005 Szarek ...................... 224/607
7,198,190 B2 * 4/2007 Juhan et al. ............... 235/380

* cited by examiner

*Primary Examiner*—Jack W. Lavinder
(74) *Attorney, Agent, or Firm*—Edward P. Dutkiewicz

(57) ABSTRACT

A hollow closed loop has two end sections and intermediate sections. Flexible sheet material is located within one of the intermediate sections remote from the end sections. The flexible sheet material is fabricated of a crinkle material.

4 Claims, 2 Drawing Sheets

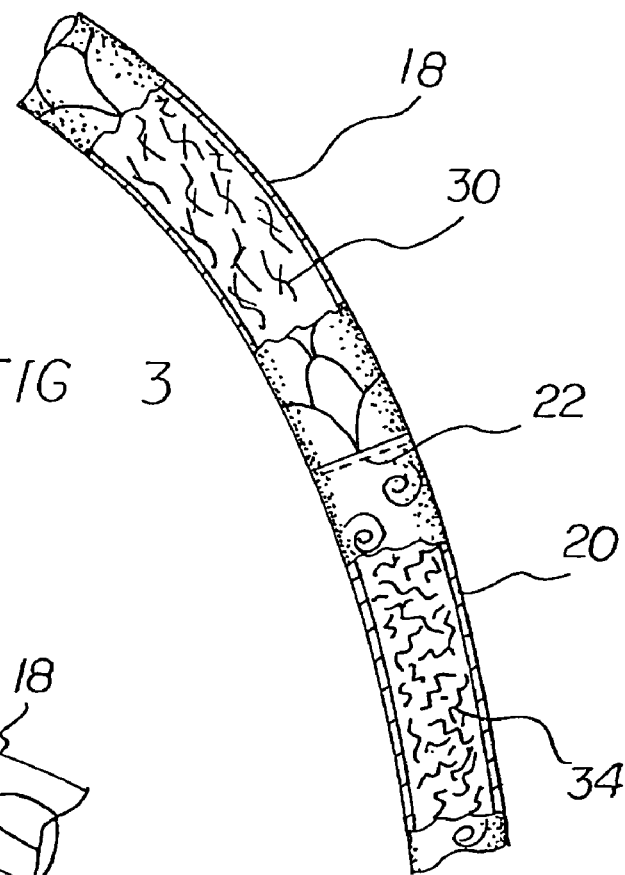
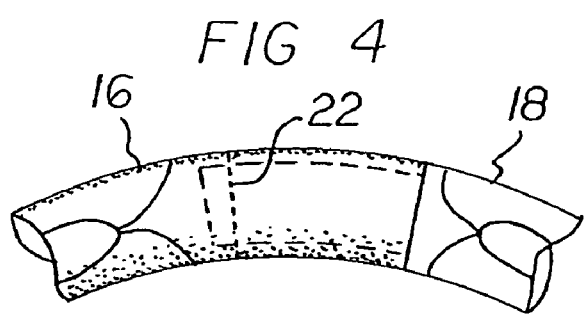
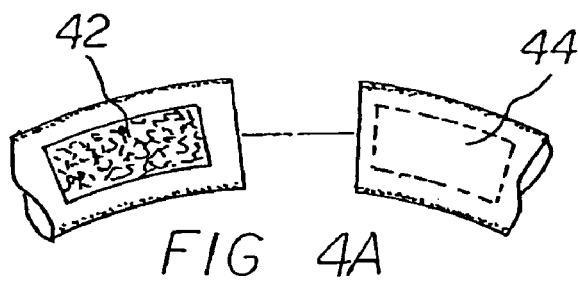
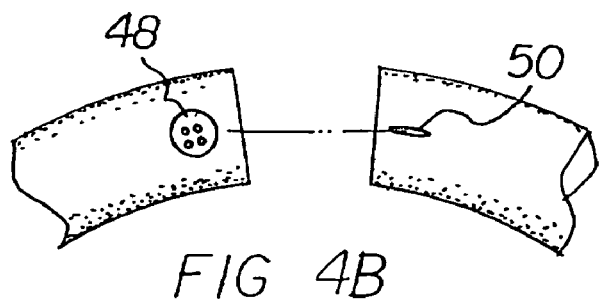

NURTURING NECKLACE SYSTEM

BACKGROUND OF THE INVENTION

1. Field of the Invention

The present invention relates to a nurturing necklace system and more particularly pertains to allowing a care giver to entertain an infant while feeding.

2. Description of the Prior Art

The use of amusement systems of known designs and configurations is known in the prior art. More specifically, amusement systems of known designs and configurations previously devised and utilized for the purpose of amusing children through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,827,109 issued Oct. 27, 1998 to Krull relates to a Method and Apparatus for Amusing Children and U.S. Pat. No. 6,431,942 issued Aug. 13, 2002 to Krull relates to Methods and Apparatus for Amusing Children.

While these devices fulfill their respective, particular objectives and requirements, the aforementioned patents do not describe a nurturing necklace system that allows allowing a care giver to entertain an infant while feeding.

In this respect, the nurturing necklace system according to the present invention substantially departs from the conventional concepts and designs of the prior art, and in doing so provides an apparatus primarily developed for the purpose of allowing a care giver to entertain an infant while feeding.

Therefore, it can be appreciated that there exists a continuing need for a new and improved nurturing necklace system which can be used for allowing a care giver to entertain an infant while feeding. In this regard, the present invention substantially fulfills this need.

SUMMARY OF THE INVENTION

In view of the foregoing disadvantages inherent in the known types of amusement systems of known designs and configurations now present in the prior art, the present invention provides an improved nurturing necklace system. As such, the general purpose of the present invention, which will be described subsequently in greater detail, is to provide a new and improved nurturing necklace system and method which has all the advantages of the prior art and none of the disadvantages.

To attain this, the present invention essentially comprises a nurturing necklace system. First provided is a hollow loop. The hollow loop has a nominal circumference. The circumference is about 40 inches. The hollow loop has a diameter. The diameter is about 2 inches. The loop has two end sections. The loop has eight intermediate sections. Each section is provided in a colorful design. Each section has a length of about four inches. Each section has stitching. The stitching couples the sections together into a closed loop configuration. In this manner the loop may be positioned around the neck of a care giver and adapted to be viewed by an infant as during feeding.

A resilient rubber band is provided. The rubber band has a width of about 0.500 inches and a thickness of about 0.0625 inches. The rubber band has a length of about 38 inches. The rubber rand is configured in a closed loop configuration. The rubber band is located concentrically within the hollow loop. The rubber band is adapted to contract the loop about five percent of its nominal circumference when relaxed. The rubber band is adapted to expand the loop about five percent of its circumference when the loop and rubber band are stretched as by an infant.

Provided next is an elastic core stuffing. The stuffing is located within and essentially fills the majority of the sections of the hollow loop. The stuffing is fabricated of an elastomeric material. The elastomeric material is selected from the class of elastomeric materials. The class of elastomeric materials includes cotton and plastic and rubber, natural and synthetic, and blends thereof. The elastomeric material is preferably a soft cotton. The hollow loop and stuffing are adapted to be squeezed and released as by an infant.

Further provided is a flexible sheet material. The flexible sheet material is located within one of the intermediate sections of the hollow loop remote from the end sections. The sheet material is fabricated of a crinkle material. The crinkle material is selected from the class of crinkle materials. The class of crinkle material includes cellophane and paper. The crinkle material is preferably cellophane. In this manner a sound is created when squeezed as by an infant.

Provided last is a plurality of fabric tags. Each tag is formed from of a ribbon. The ribbon is in a closed loop configuration. The ribbon has a circumference of about four inches and a width of between about 0.50 inches and 1.00 inches. The tags are coupled to the hollow loop remote from the end sections. In this manner the tags may be handled as by an infant as during feeding for the purpose of entertaining and amusing while being fed by a care giver wearing the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved nurturing necklace system which has all of the advantages of the prior art amusement systems of known designs and configurations and none of the disadvantages.

It is another object of the present invention to provide a new and improved nurturing necklace system which may be easily and efficiently manufactured and marketed.

It is further object of the present invention to provide a new and improved nurturing necklace system which is of durable and reliable constructions.

An even further object of the present invention is to provide a new and improved nurturing necklace system which is susceptible of a low cost of manufacture with regard to both materials and labor, and which accordingly is then susceptible of low prices of sale to the consuming public, thereby making such nurturing necklace system economically available to the buying public.

Even still another object of the present invention is to provide a nurturing necklace system for allowing a care giver to entertain an infant while feeding.

Lastly, it is an object of the present invention to provide a new and improved nurturing necklace system. A hollow closed loop has two end sections and intermediate sections. Flexible sheet material is located within one of the intermediate sections remote from the end sections. The flexible sheet material is fabricated of a crinkle material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged view, partly in cross section, of a portion of the system taken at circle 3 of FIG. 1.

FIG. 4 is an enlarged view, partly in cross section, of a portion of the system taken at circle 4 of FIG. 1.

FIGS. 4A and 4B are enlarged views, partly in cross section, of a portion of the system similar to FIG. 4 but illustrating alternate embodiments of the invention.

The same reference numerals refer to the same parts throughout the various Figures.

DESCRIPTION OF THE PREFERRED EMBODIMENT

Figure 1:
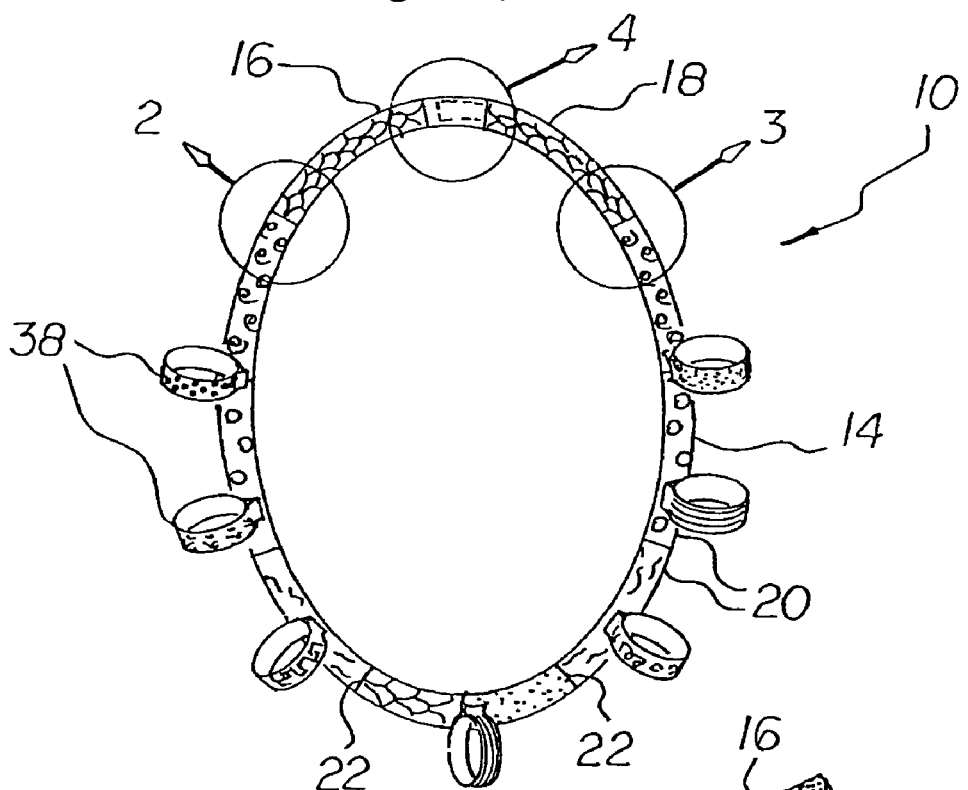
FIG. 1 is a front elevational view of a nurturing necklace system constructed in accordance with the principles of the present invention.
Figure 2:
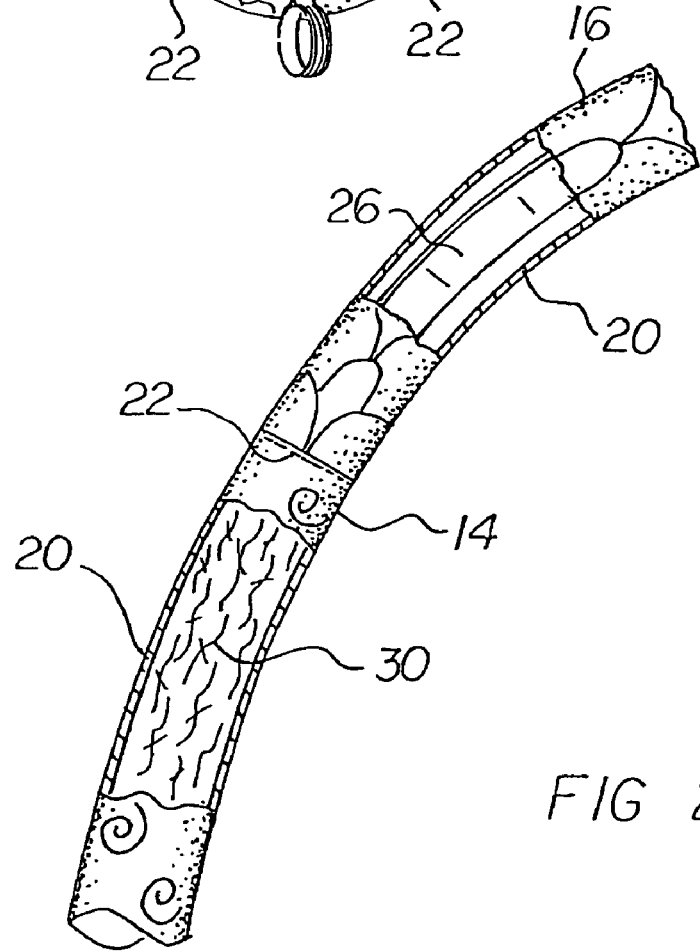
FIG. 2 is an enlarged view, partly in cross section, of a portion of the system taken at circle 2 of FIG. 1.

With reference now to the drawings, and in particular to FIG. 1 thereof, the preferred embodiment of the new and improved nurturing necklace system embodying the principles and concepts of the present invention and generally designated by the reference numeral 10 will be described.

The present invention, the nurturing necklace system 10 is comprised of a plurality of components. Such components in their broadest context include a hollow closed loop and flexible sheet material. Such components are individually configured and correlated with respect to each other so as to attain the desired objective.

First provided is a hollow loop 14. The hollow loop has a nominal circumference. The circumference is about 40 inches. The hollow loop has a diameter. The diameter is about 2 inches. The loop has two end sections 16, 18. The loop has eight intermediate sections 20. Each section is provided in a colorful design. Each section has a length of about four inches. Each section has stitching 22. The stitching couples the sections together into a closed loop configuration. In this manner the loop may be positioned around the neck of a care giver and adapted to be viewed by an infant as during feeding.

A resilient rubber band 26 is provided. The rubber band has a width of about 0.500 inches and a thickness of about 0.0625 inches. The rubber band has a length of about 38 inches. The rubber rand is configured in a closed loop configuration. The rubber band is located concentrically within the hollow loop. The rubber band is adapted to contract the loop about five percent of its nominal circumference when relaxed. The rubber band is adapted to expand the loop about five percent of its circumference when the loop and rubber band are stretched as by an infant.

Provided next is an elastic core stuffing 30. The stuffing is located within and essentially fills the majority of the sections of the hollow loop. The stuffing is fabricated of an elastomeric material. The elastomeric material is selected from the class of elastomeric materials. The class of elastomeric materials includes cotton and plastic and rubber, natural and synthetic, and blends thereof. The elastomeric material is preferably a soft cotton. The hollow loop and stuffing are adapted to be squeezed and released as by an infant.

Further provided is a flexible sheet material 34. The flexible sheet material is located within one of the intermediate sections of the hollow loop remote from the end sections. The sheet material is fabricated of a crinkle material. The crinkle material is selected from the class of crinkle materials. The class of crinkle material includes cellophane and paper. The crinkle material is referably cellophane. In this manner a sound, is created when squeezed as by an infant.

Provided last is a plurality of fabric tags 38. Each tag is formed from of a ribbon. The ribbon is in a closed loop configuration. The ribbon has a circumference of about four inches and a width of between about 0.50 inches and 1.00 inches. The tags are coupled to the hollow loop remote from the end sections. In this manner the tags may be handled as by an infant as during feeding for the purpose of entertaining and amusing while being fed by a care giver wearing the system.

An alternate embodiment of the invention is illustrated in FIG. 4A. Hook and loop fasteners 42, 44 are provided at the respective ends of the end sections for releasably coupling the ends of the hollow loop.

An alternate embodiment of the invention is illustrated in FIG. 4B. A button 48 is provided. A button hole 50 is also provided. There is thus created a fastener assembly at the respective ends of the end sections for releasably coupling the ends of the hollow loop.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A nurturing necklace system comprising:
   a hollow closed loop having two end sections and intermediate sections;
   flexible sheet material located within one of the intermediate sections remote from the end sections fabricated of a crinkle material; and
   a resilient rubber band in a closed loop configuration located concentrically within the hollow loop.

2. A nurturing necklace system comprising:
   a hollow closed loop having two end sections and intermediate sections;
   flexible sheet material located within one of the intermediate sections remote from the end sections fabricated of a crinkle material; and
   an elastic core stuffing located within and essentially filling sections of the hollow loop.

3. A nurturing necklace system comprising:
   a hollow closed loop having two end sections and intermediate sections;
   flexible sheet material located within one of the intermediate sections remote from the end sections fabricated of a crinkle material; and
   a plurality of fabric tags in closed loop configurations coupled to the hollow loop remote from the end sections.

4. A nurturing necklace system for allowing a care giver to entertain an infant while feeding through viewing brightly colored fabric, stretching a resilient loop, squeezing elastic sections, listening to crinkling sounds and handling tags of the loop comprising, in combination:
   a hollow loop having a nominal circumference of about 40 inches and a diameter of about 2 inches, the loop having two end sections and eight intermediate sections, each section being in a colorful design, each section having a length of about four inches with stitching coupling the sections together into a closed loop configuration for positioning around the neck of a care giver and adapted to be viewed by an infant as during feeding;
   a resilient rubber band having a width of about 0.500 inches and a thickness of about 0.0625 inches and a relaxed length of about 38 inches configured in a closed loop configuration, the rubber band being located concentrically within the hollow loop and adapted to contract the loop about five percent of its nominal circumference when relaxed, the rubber band adapted to expand the loop about five percent of its circumference when the loop and rubber band are stretched as by an infant;
   an elastic core stuffing located within and essentially filling the majority of the sections of the hollow loop, the stuffing being fabricated of an elastomeric material selected from the class of elastomeric materials including cotton and plastic and rubber, natural and synthetic, and blends thereof, preferably a soft cotton, the hollow loop and stuffing adapted to be squeezed and released as by an infant;
   flexible sheet material located within one of the intermediate sections of the hollow loop remote from the end sections, the sheet material being fabricated of a crinkle material selected from the class of crinkle materials including cellophane and paper, preferably cellophane, for creating a sound when squeezed as by an infant; and
   a plurality of fabric tags, each tag being formed from of a ribbon in a closed loop configuration with a circumference of about four inches and a width of between about 0.50 inches and 1.00 inches, the tags being coupled to the hollow loop remote from the end sections for being handled as by an infant as during feeding for the purpose of entertaining and amusing while being fed by a care giver wearing the system.

* * * * *